G. ELMORE.
FILTER.
APPLICATION FILED NOV. 27, 1917.
1,259,498. Patented Mar. 19, 1918.
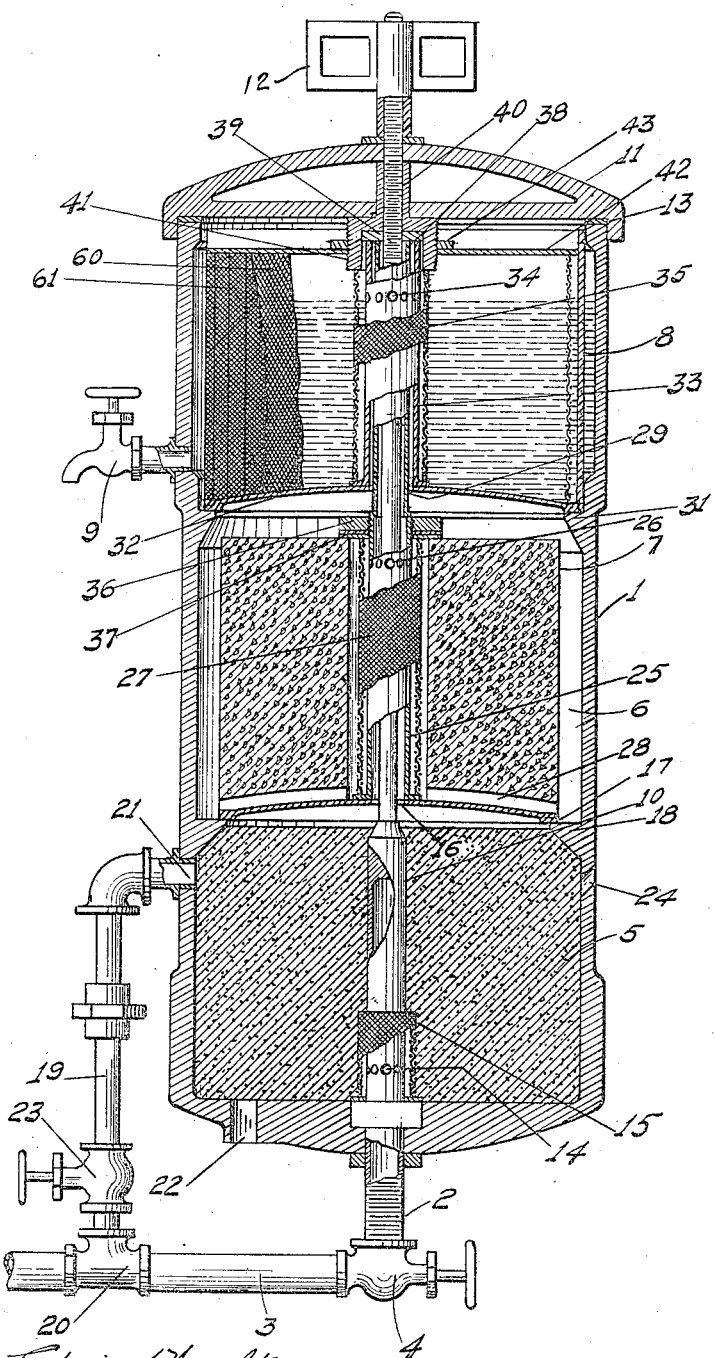
Witness: Edwin J. Wright
George Elmore   Inventor
By A. L. Ely   Attorney

UNITED STATES PATENT OFFICE.

GEORGE ELMORE, OF AKRON, OHIO.

FILTER.

1,259,498.  Specification of Letters Patent.  Patented Mar. 19, 1918.

Application filed November 27, 1917. Serial No. 204,270.

*To all whom it may concern:*

Be it known that I, GEORGE ELMORE, a citizen of the United States, residing at Akron, in the county of Summit, State of Ohio, have invented certain new and useful Improvements in Filters, of which the following is a specification.

This invention has as its object the construction of an improved filter which will quickly and thoroughly remove all impurities from the water, may be easily refilled or replaced as desired, and is simple in construction and operation.

The improved filter comprises three compartments, each of which is designed to remove certain impurities from the water, the last compartment being a reservoir in which the water is stored, and from which it may be drawn in pure condition.

These and other objects will appear as the description proceeds, and it is understood that my invention is not limited to the details shown or described.

The drawing accompanying this application shows a vertical section through the center of the filter, certain parts being broken away to show the internal construction.

The filter comprises a long cylindrical tank-like body 1, in the bottom of which is secured a leading-in pipe 2, connecting with the water supply pipe 3, a valve 4 being interposed to allow the water to be shut off at this point for the purpose of cleaning or replacing any parts of the filter.

The filter is divided into three compartments, the lower one of which is designated by the numeral 5 and is filled with charcoal, sand or other well-known granular filtering material, which removes the greatest part of the solid or suspended impurities. The second or middle compartment is designated by the numeral 6 and is filled with a solid, porous stone 7, well known as a filtering agent which is for the purpose of removing finer or bacterial impurities which are not removed in the first compartment. The third or top compartment, 8, forms a reservoir for the filtered water in which may settle fine impurities and from which the water can be drawn through a cock 9 as required.

Through the axis of the tank 1 there extends a center pin or post 10 which is preferably formed as an extension of the pipe 2. The top of the tank is closed by a cover 11 which is clamped down on the top of the tank by a wing-nut 12, screwing on to the threaded end of the pin 10. A gasket 13 is placed between the tank and the top to form a water-tight joint.

The water in entering the filter passes through the hollow lower end of the center pin and through holes 14 near the bottom of the tank and through a wire screen 15 which may be placed around it. This delivers the water through the charcoal or sand which removes a large amount of the impurities, and it then passes up into the second compartment through a hole 16 in a plate 17 supported on a shelf 18 formed on the inside of the tank.

For the purpose of cleaning out the compartment 5 I provide a by pass 19 extending from a T-joint 20 in the pipe 3. This by pass leads into the upper part of the chamber 5 as at 21. A flushing port is provided at 22 and a valve in the by-pass 19 as at 23. When it is desired to clean out the compartment 5, the valve 4 is closed and the valves 22 and 23 opened, whereupon the water is violently reversed in the compartment and the granular filtering material is thoroughly washed out. A refilling hole 24 may be provided if desired.

From the hole 16 the water passes up into a central tube 25 secured to a metal plate 17, carrying the stone, which tube surrounds the pin 10. The water passes through perforations 26 and through a wire screen 27 into the body of the stone 7. The porosity of the stone may be sufficient to enable the water to percolate to the exterior of the compartment 6, or, preferably, passages 28 are provided, a sufficiently intimate contact being allowed between the water and the stone to effect removal of the bacterial impurities.

From the exterior of the compartment 6 the water passes through a central aperture 29 in a plate 32 resting on a shelf 31 on the inside of the tank, and dividing the compartment 6 from compartment 8. Secured to the plate 32 is an upright tube 33 provided with openings 34 through which the water passes. A wire screen 35 surrounds the tube and separates it from the reservoir 8. Around the outer edge of the plate 32 is placed an upright fine mesh screen 60 around which is placed a perforated jacket 61, the upper end of which is supported by the upper inside edge of the tank. If desired a filter cloth may be placed about the screen 60. The purified water passes through the screen and into the space between it and the wall of the tank from which it may be drawn by the spigot 9.

The tube 25 is screw-threaded at about its midway point and on this screw-threaded portion is engaged a nut 36 having at its under side washers 37 which rest on the screen 27 and the stone 7 and hold them in place. Tube 25 is reduced and extends upwardly as at 38, terminating flush with the tube 33. On top of these tubes is mounted a washer 39 which is held down by a flanged nut 40 having engagement with the screw-threaded end of the central post. The downwardly extending flanges 41 of nut 40 rest on the top of the screen 35. A cover plate 42 is placed on top of the screen 60 and jacket 61, being held in place by a washer 43 screwed on to the outside of nut 40.

The operation of the filter will be readily understood and it is not believed to be necessary to enter into a further discussion of it. By the use of this filter I am enabled to obtain better results than with other filters known to me, and it admits of a ready cleaning or replacement.

It is obvious that changes and modifications may be made in the invention without departing from the spirit thereof or sacrificing any of its benefits.

I claim:

1. A filter comprising a tank, a plate in the lower part of said tank forming a compartment adapted to contain granular filtering material, a second plate above the first thereby forming a compartment, a filtering stone in said second compartment, a tube on said first named plate receiving water from the first compartment and delivering it to the center of said stone, means to draw off the water above said second plate, and a conduit for the water whereby it is collected above said second plate.

2. A filter comprising a tank, a plate in the lower part of said tank forming a compartment adapted to contain granular filtering material, a filtering stone carried on said plate, means for conducting water into the center of said granular material, a tube secured to said plate and provided with apertures for conducting water from said compartment to the center of said stone, a collecting reservoir in said tank, means for conducting water from the outside of said stone to said reservoir, a screen surrounding said reservoir, and means for drawing off water outside of the screen.

3. A filter comprising a tank, a pin located centrally of said tank, a plate in the lower part of said tank forming a compartment adaptable to receive granular filtering material, a filtering stone on the plate, a tube carried by said plate and surrounding the pin, the tube furnishing a conduit for water from said compartment to said stone, and a collection reservoir above the said stone.

4. A filter comprising a tank, a pin located centrally of said tank, a plate in the lower part of said tank and forming a compartment adapted to receive granular filtering material, a filtering stone on said plate, a tube carried by said plate and surrounding the pin, the tube furnishing a conduit for water from said compartment to said stone, a second plate above said stone, a second tube secured to said plate, and a collection reservoir above said second plate supplied from said second named tube.

5. A filter comprising a tank, a pin located centrally of said tank, a plate in the lower part of said tank forming a compartment adapted to receive granular filtering material, a filtering stone on said plate, a tube carried by said plate and surrounding the pin, the tube forming a conduit for water from said compartment to the center of said stone, a second plate above said stone, a second tube secured to said plate, a collection reservoir above said second plate supplied from said second tube, a cover on said tank, and means carried by said pin to secure said cover in place.

GEORGE ELMORE.

Copies of this patent may be obtained for five cents each, by addressing the "Commissioner of Patents, Washington, D. C."